United States Patent
Bucur et al.

(10) Patent No.: US 8,294,421 B2
(45) Date of Patent: Oct. 23, 2012

(54) CELL BALANCING SYSTEMS EMPLOYING TRANSFORMERS

(75) Inventors: Constantin Bucur, Sunnyvale, CA (US); Stefan Maireanu, Sunnyvale, CA (US)

(73) Assignee: O2Micro Inc, Santa Clara, CA (US)

( * ) Notice: Subject to any disclaimer, the term of this patent is extended or adjusted under 35 U.S.C. 154(b) by 81 days.

(21) Appl. No.: 12/552,516

(22) Filed: Sep. 2, 2009

(65) Prior Publication Data

US 2010/0225275 A1    Sep. 9, 2010

Related U.S. Application Data

(60) Provisional application No. 61/191,182, filed on Sep. 5, 2008.

(51) Int. Cl.
*H02J 7/00* (2006.01)

(52) U.S. Cl. ......... 320/116; 320/117; 320/118; 320/119

(58) Field of Classification Search ........... 320/116–125
See application file for complete search history.

(56) References Cited

U.S. PATENT DOCUMENTS

| | | |
|---|---|---|
| 5,576,609 A | 11/1996 | Brown et al. |
| 5,703,470 A | 12/1997 | Baranowski et al. |
| 5,869,950 A | 2/1999 | Hoffman, Jr. et al. |
| 6,040,683 A | 3/2000 | Mottier et al. |
| 6,118,254 A | 9/2000 | Faulk et al. |
| 6,229,283 B1 | 5/2001 | Kalogeropoulus et al. |
| 6,356,055 B1 | 3/2002 | Lin et al. |
| 6,667,606 B2 | 12/2003 | Oglesbee et al. |
| 6,861,824 B1 | 3/2005 | Liu et al. |
| 7,193,392 B2 | 3/2007 | King et al. |
| 7,372,235 B2 | 5/2008 | Mori et al. |
| 7,538,528 B2 | 5/2009 | Heath |
| 7,564,219 B2 | 7/2009 | Choi et al. |
| 8,018,200 B2 | 9/2011 | Enjalbert et al. |
| 2003/0042437 A1 | 3/2003 | Worley et al. |
| 2005/0017682 A1* | 1/2005 | Canter et al. ........... 320/118 |
| 2005/0270808 A1* | 12/2005 | Choi et al. ........... 363/21.01 |
| 2006/0291258 A1* | 12/2006 | Zhu et al. ........... 363/21.12 |

FOREIGN PATENT DOCUMENTS

| | | |
|---|---|---|
| CN | 1819398 A | 8/2006 |
| WO | 2007/145464 A1 | 12/2007 |
| WO | 2007145460 A1 | 12/2007 |

* cited by examiner

*Primary Examiner* — Samuel Berhanu (57) ABSTRACT

A cell balancing circuit for balancing battery cells includes a transformer and a switching controller. The transformer has a primary winding and a secondary winding. The switching controller can select a first cell coupled to the primary winding and select a second cell coupled to the secondary winding. The first cell and the second cell are coupled in series. The first cell has a cell voltage that is greater than the second cell. The cell balancing circuit further includes a controller coupled to the primary winding. The controller controls energy from the first cell to the primary winding so as to transfer the energy from the first cell to the second cell to balance the battery cells.

20 Claims, 10 Drawing Sheets

CELL BALANCING SYSTEMS EMPLOYING TRANSFORMERS

RELATED APPLICATION

This application claims priority to U.S. Provisional Application No. 61/191,182, filed on Sep. 5, 2008, which is hereby incorporated by reference in its entirety.

BACKGROUND

A battery, e.g., a Li-Ion battery can include multiple cells connected in parallel and/or in series. In a multi-cell battery pack, cells may differ from each other due to cell aging and/or different cell temperatures. A voltage difference among the cells may increase as the number of charging/discharging cycles increases, which may cause imbalance between the cells and may shorten a battery life.

Traditional cell balancing methods include discharging cells having relatively high cell voltages by connecting external loads (e.g., resistors) in parallel to the cells. However, such traditional cell balancing methods may induce considerable thermal energy dissipation, e.g., in electric vehicle (EV) applications.

SUMMARY

In one embodiment, a cell balancing circuit for balancing battery cells includes a transformer and a switching controller. The transformer has a primary winding and a secondary winding. The switching controller can select a first cell coupled to the primary winding and select a second cell coupled to the secondary winding. The first cell and the second cell are coupled in series. The first cell has a cell voltage that is greater than the second cell. The cell balancing circuit further includes a controller coupled to the primary winding. The controller controls energy from the first cell to the primary winding so as to transfer the energy from the first cell to the second cell to balance the battery cells.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION

Reference will now be made in detail to the embodiments of the present invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments in accordance with the present invention provide battery cell balancing systems which can balance battery cells in a battery pack by transferring energy from one or more cells having relatively high cell voltages to one or more unbalanced cell, e.g., a cell having the lowest cell voltage in the battery pack. In addition, embodiments in accordance with the present invention provide cell balancing systems which can balance battery cells in a battery pack by transferring energy from other battery pack(s) to one or more unbalanced cell in the battery pack. Advantageously, such active battery cell balancing can achieve higher efficiency and keep the battery cells in a desired range of voltages and temperatures. Thermal energy dissipation can be reduced.

Figure 1:
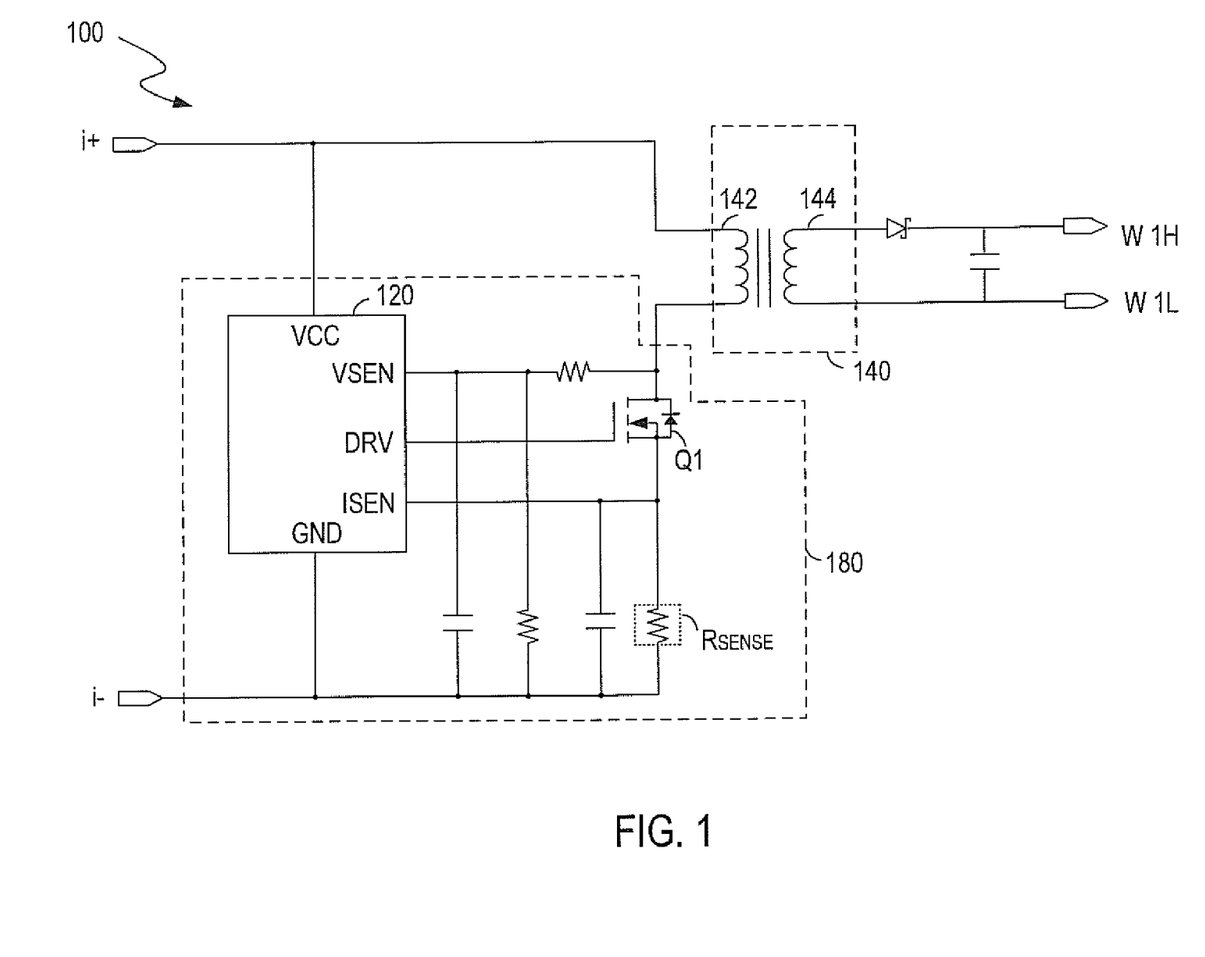
FIG. 1 shows a block diagram of a cell balancing circuit, in accordance with one embodiment of the present invention.

FIG. 1 shows a block diagram of a cell balancing circuit 100, in accordance with one embodiment of the present invention. The cell balancing circuit 100 includes a balancing controller 180 and a transformer 140. The balancing controller 180 further includes a switch Q1, a sense resistor Rsense, and a controller 120 for controlling the switch Q1. The transformer 140 has a primary winding 142 coupled in series with the switch Q1 and has a secondary winding 144.

The terminals i+ and i− can be coupled to one or more cells having relatively high cell voltages and terminals w1$l$ and w1$h$ can be coupled to an unbalanced cell. In one embodiment, the unbalanced cell is a cell having a relatively low cell voltage, e.g., the cell having the lowest cell voltage (or lowest cell capacity). Advantageously, the balancing controller 180 can control the transformer 140 to transfer energy from one or more cells having relatively high cell voltages to the unbalanced cell such that the cell voltages in the battery pack can be balanced.

The controller 120 can generate a control signal, e.g., a pulse width modulation (PWM) signal, via a DRV pin to control the switch Q1 on and off, according to a current flowing through the primary winding 142. The controller 120 senses the current flowing through the primary winding 142 by sensing a voltage drop on the sense resistor Rsense via an ISEN pin. By way of example, the winding ratio between the primary winding 142 and the secondary winding 144 is 1:1, such that the voltage drop on the sense resistor Rsense can indicate a level of a current flowing through the secondary winding 142. However, the invention is not so limited; the winding ratio between the primary winding and the secondary winding 144 can be different than 1:1. In one embodiment, the controller 120 is a constant charging current controller. As a result, the current flowing through the secondary winding 144 can be substantially constant by controlling the switch Q1. Consequently, by controlling the power from the primary winding 142 to the secondary winding 144, the energy from the cells having relatively high cell voltages can be transferred to the unbalanced cell, e.g., the cell having the lowest cell voltage.

Moreover, the controller 120 can sense a voltage across the primary winding of the transformer 140 via a pin VSEN, and can compare the sensed signal with a predetermined threshold to perform over-voltage protection. For example, the controller 120 can switch off the switch Q1 if the sensed signal at the pin VSEN is greater than the predetermined threshold.

Figure 2:
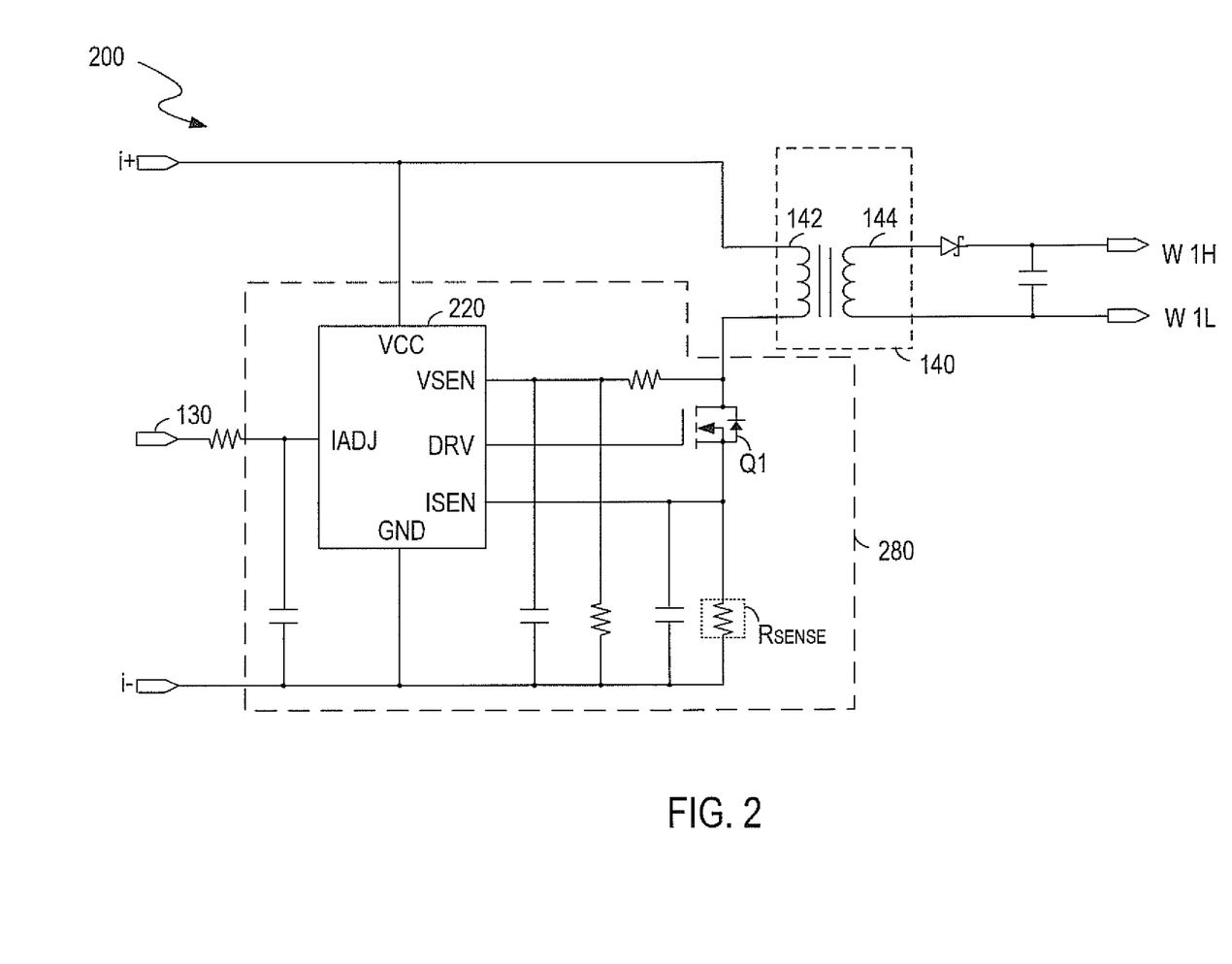
FIG. 2 shows a block diagram of a cell balancing circuit, in accordance with one embodiment of the present invention.

FIG. 2 shows a block diagram of a cell balancing circuit 200, in accordance with one embodiment of the present invention. Elements labeled the same as in FIG. 1 have similar functions and will not be detailed described herein. The cell balancing system 200 includes a balancing controller 280 and a transformer 140. The balancing controller 280 further includes a switch Q1, a sense resistor Rsense, and a controller 220 for controlling the switch Q1. In one embodiment, the controller 220, e.g., a constant charging current controller, further receives a preset reference signal 130 via an IADJ pin. The preset reference signal 130 indicates a predetermined or desired current flowing through the secondary winding 144. The controller 220 senses the current flowing through the primary winding 142 via the ISEN pin and controls the current flowing through the primary winding 142 by controlling the switch Q1 according to the preset reference signal 130. Consequently, the controller 220 can control the current flowing through the secondary winding 144 according to the preset reference signal 130. The preset reference signal 130 can be predetermined by a user according to different application requirements.

Figure 3:
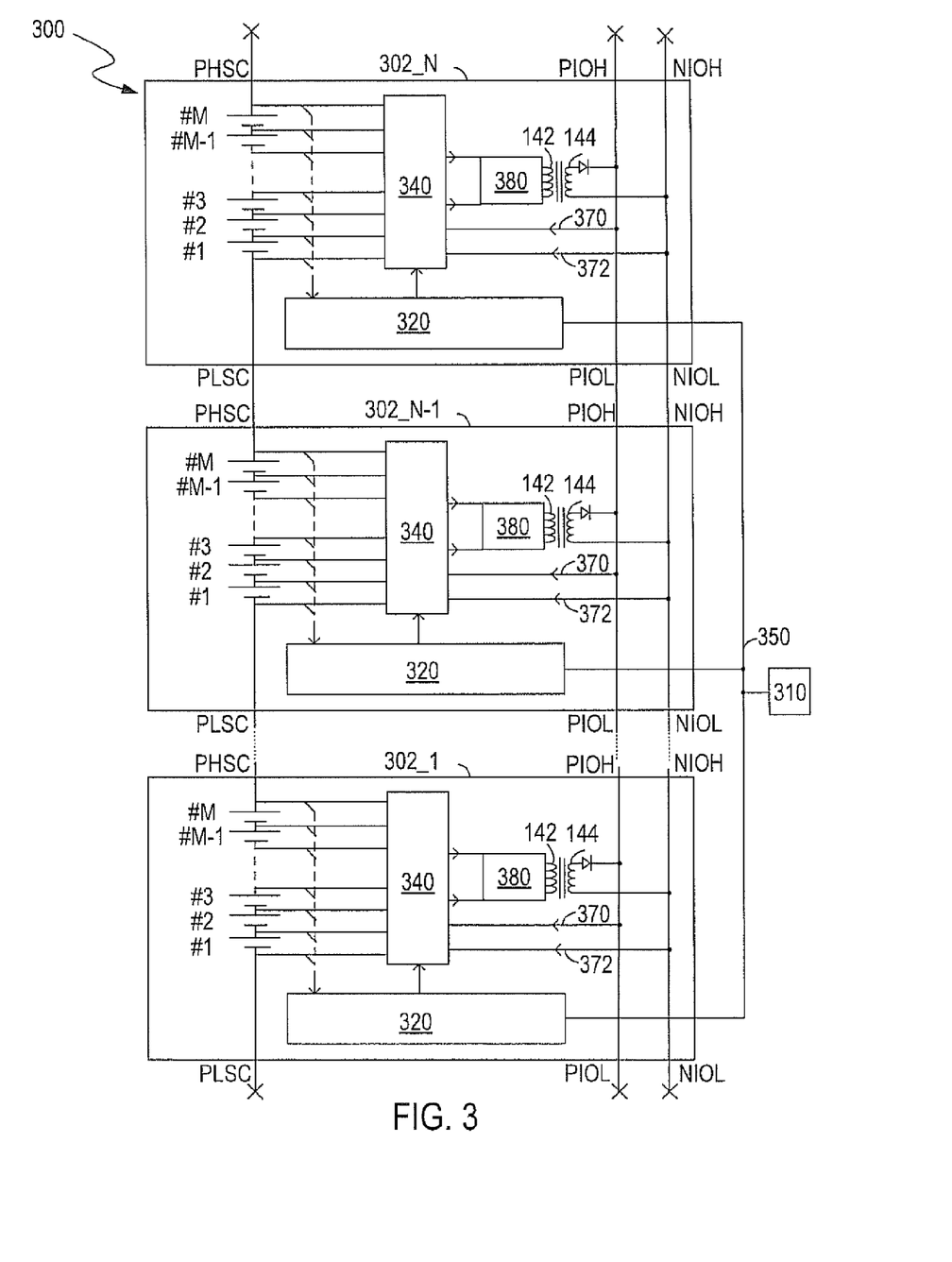
FIG. 3 shows a block diagram of a cell balancing system for multiple battery packs in series, in accordance with one embodiment of the present invention.

FIG. 3 shows a block diagram of a cell balancing system 300 for multiple battery packs, in accordance with one embodiment of the present invention. The cell balancing system 300 includes multiple battery packs 302_1-302_N. Each battery pack 302_1-302_N includes a switching circuit 340, a switching controller 320 for controlling the switching circuit 340, and a balancing controller 380, in one embodiment. Each battery pack 302_1-302_N also includes multiple cells #1-#M, in one embodiment. However, the invention is not so limited, different battery packs can have different number of cells.

By monitoring the cell voltages of the cells #1-#M, the switching controller 320 can select one or more cells having relatively high cell voltages to be coupled to a corresponding primary winding 142 via the switching circuit 340. The balancing controller 380 can control energy from the battery cells to the corresponding primary winding 142 via the switching circuit 340. The balancing controller 380 is similar to the balancing controller 180 and 280 in FIG. 1 and FIG. 2. Moreover, the switching controller 320 can select one or more unbalanced cells to be coupled to a corresponding secondary winding 144 via the switching circuit 340. The switching circuit 340 can transfer power from the secondary winding 144 to unbalanced cell(s) via output lines 370 and 372. As such, the balancing controller 380 coupled to the corresponding primary winding 142 can control the energy from the cells having relatively high cell voltages to the unbalanced cell(s). Therefore, the cell voltages of the cells #1-#M in a battery pack can be balanced.

In one embodiment, a master controller 310 can be coupled to and communicate with each controller 320 in each battery pack 302_1-302_N via a bus 350. The master controller 310 can monitor the cell status such as the cell voltages in each battery pack 302_1-302_N and can control the switching controllers 320 accordingly. In another embodiment, the master controller 310 can be omitted, and any of the controllers 320 can be assigned as a master controller.

Advantageously, the cell balancing system 300 can transfer the energy from any cell(s) in battery packs 302_1-302_N to the unbalanced cell(s) so as to balance all the cell voltages of the battery packs 302_1-302_N. The master controller 310 can monitor cell status such as cell voltages and thus instruct a corresponding switching controller 320 to enable the energy from one or more cells having relatively high cell voltages to be transferred to a corresponding primary winding 142 via a corresponding switching circuit 340 and a corresponding balancing controller 380. Thus, power can be transferred from the primary winding 142 to a corresponding secondary winding 144. The master controller 310 can further instruct the corresponding switching controller 320 to transfer the power from the corresponding secondary winding 144 to the unbalanced cell(s), e.g., the cell having the lowest cell voltage among all the battery packs 302_1-302_N, via output lines 370 and 372 and the corresponding switching circuit 340. As a result, in one embodiment, the energy from the battery cell(s) in a battery pack can be transferred to an unbalanced cell in the same battery pack. In another embodiment, the energy from the battery cell(s) in a battery pack can be transferred to an unbalanced cell in another battery pack.

For example, the master controller 310 may detect that cell #3 in the battery pack 302_N-1 is unbalanced, e.g., the cell #3 in the battery pack 302_N-1 has the lowest cell voltage compared to all the other cells in battery packs 302_1-302_N. As a result, the master controller 310 can instruct the energy from one or more cell(s) having relatively high voltages to be transferred to the unbalanced cell #3 in the battery pack 302_N-1.

By way of example, if cell #5 in the same battery pack 302_N-1 has the highest cell voltage compared to all the other cells in battery packs 302_1-302_N, the master controller 310 can enable the balancing controller 380 in battery pack 302_N-1 while disabling other balancing controllers 380, and instruct the switching controller 320 in the battery pack 302_N-1 to control the switching circuit 340 such that the energy from the cell #5 in the battery pack 302_N-1 can be transferred to the primary winding 142 in the battery pack 302_N-1. As such, the power from the secondary winding 144 can be transferred to the unbalanced cell #3 via the output lines 370 and 372 and via the switching circuit 340 in the battery pack 302_N-1.

If the master controller 310 determines that cell #2 in the battery pack 302_N has the highest cell voltage compared to all the other cells in battery packs 302_1-302_N, the master controller 310 can enable the balancing controller 380 in battery pack 302_N while disabling other balancing controllers 380, and instruct the switching controller 320 in the battery pack 302_N to control the corresponding switching circuit 340 such that the energy from the cell #2 in the battery pack 302_N can be transferred to the primary winding 142 via the balancing controller 380 in battery pack 302_N. As such, the power from the corresponding secondary winding 144 in battery pack 302_N can be transferred to the unbalanced cell

3 in battery pack 302_N-1 via the output lines 370 and 372 and the switching circuit 340 in the battery pack 302_N-1.

As a result, as shown in FIG. 3, cell balancing can be achieved by transferring the energy from one or more cells having relatively high cell voltages to the unbalanced cell(s). The energy transferred to the unbalanced cell(s) can be taken from the cell(s) in the same battery pack as the unbalanced cell(s) or from the cell(s) in another battery pack.

Figure 4:
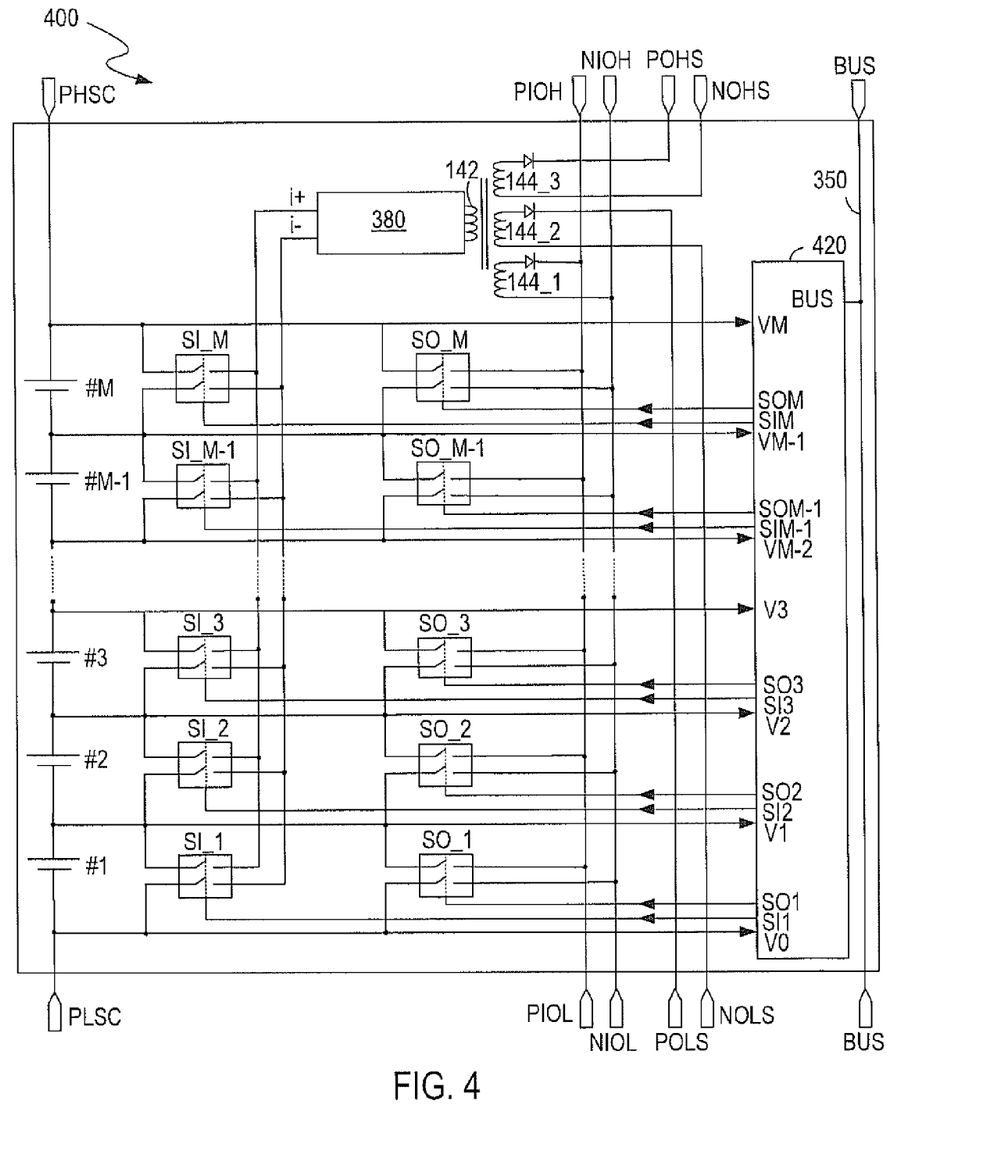
FIG. 4 shows a block diagram of a cell balancing system for a battery pack, in accordance with one embodiment of the present invention.

FIG. 4 shows a block diagram of a cell balancing system 400 for a battery pack, in accordance with one embodiment of the present invention. Elements labeled the same as in FIG. 3 have similar functions and will not be detailed described herein. In FIG. 4, a switching controller 420 can monitor the cell voltages via signals V0-VM for cells #1-#M in the battery pack and control a switching circuit including input switches SI_1-SI_M and output switches SO_1-SO_M according to the cell voltages. The switching controller 420 can further communicate with a master controller via a bus 350. The input switches SI_1-SI_M are coupled to the cells #1-#M respectively. The output switches SO_1-SO_M are coupled to the cells #1-#M respectively. More specifically, the switching controller 420 controls the input switches SI_1-SI_M by switching signals SI_1-SI_M. The switching controller 420 can selectively conduct one or more input switches from the input switches SI_1-SI_M to transfer the energy from one or more cells having relatively high cell voltages to the primary winding 142 via the balancing controller 380.

In one embodiment, the transformer has three secondary windings 144_1, 144_2 and 144_3. The ratio of the primary winding to each secondary winding 144_1-144_3 is 1:1, in one embodiment. As a result, assuming that the current flowing through the primary winding 142 is constant, the current flowing through each secondary winding 144_1-144_3 can be substantially equal to the same constant level. The switching controller 420 controls the output switches SO_1-SO_M by switching signals SO1-SOM. The output switches SO_1-SO_M are coupled to the secondary winding 144_1, in one embodiment. By conducting one or more output switches from the output switches SO_1-SO_M, the power from the secondary winding 144_1 of the transformer (e.g., energy from one or more battery cells) can be transferred to any unbalanced cells.

For example, if cell #2 is unbalanced (e.g., cell #2 has the lowest cell voltage compared to any other cell), the switching controller 420 will switch on the switch SO_2 so as to allow energy from one or more cells having relatively high cell voltages to be transferred to the unbalanced cell #2. The secondary winding 144_2 and 144_3 can be respectively coupled to a lower side battery pack (not shown in FIG. 4) and a higher side battery pack (not shown in FIG. 4), which will be described in relation to FIG. 6.

Figure 5:
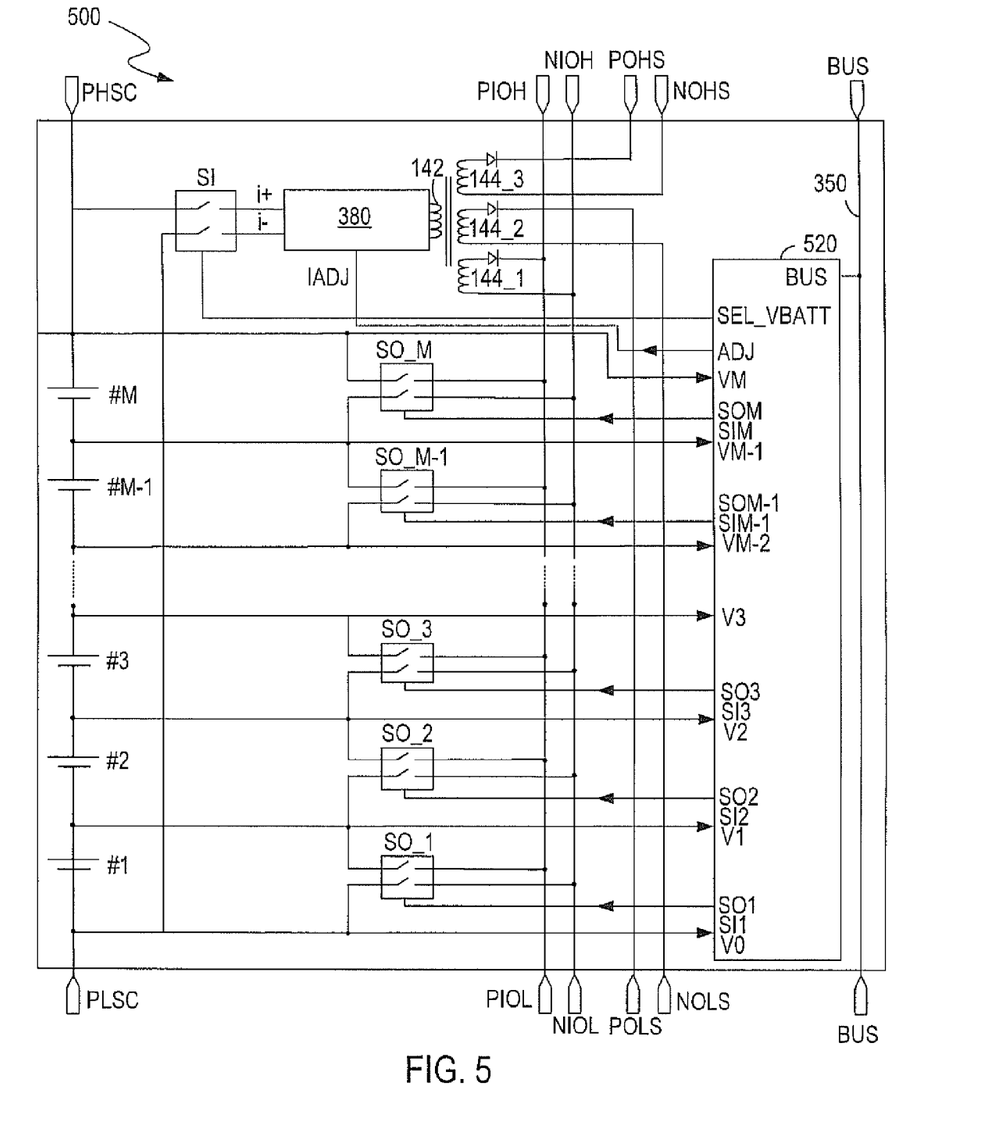
FIG. 5 shows a block diagram of a cell balancing system for a battery pack, in accordance with one embodiment of the present invention.

FIG. 5 shows a block diagram of a cell balancing system 500 for a battery pack, in accordance with one embodiment of the present invention. Elements labeled the same as in FIG. 4 have similar functions and will not be detailed described herein. The cell balancing system 500 includes a switching controller 520 which can control a switching circuit including output switches SO_1-SO_M and an input switch SI. More specifically, the switching controller 520 controls the input switch SI by a switching signal SEL_VBATT. If the switch SI is switched on, the battery pack voltage will be applied to the input of balancing controller 380. In other words, the battery pack voltage can be transferred to the primary winding 142 via the input switch SI. Similar to FIG. 4, the switching controller 520 controls the output switches SO_1-SO_M by switching signals SO1-SOM. The switching controller 520 can further generate a preset reference signal ADJ to control the currents flowing through the secondary windings 144_1-144_3. Consequently, the energy from the whole battery pack can be used to charge any unbalanced cell(s) in the battery pack 500 under the control of the switching controller 520.

Figure 6:
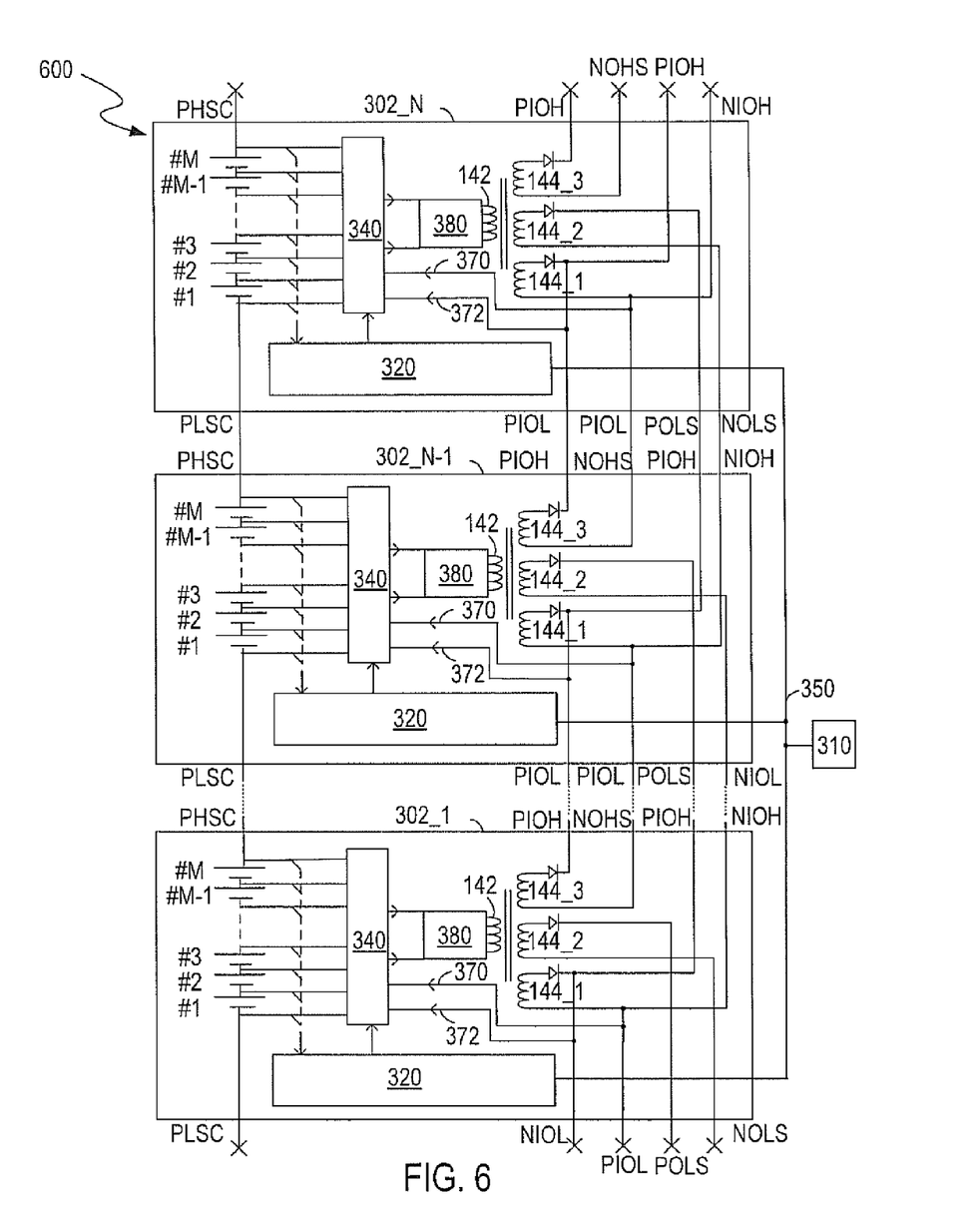
FIG. 6 shows a block diagram of a cell balancing system for a plurality of battery packs in series, in accordance with one embodiment of the present invention.

FIG. 6 shows a block diagram of a cell balancing system 600 for multiple battery packs in series, in accordance with one embodiment of the present invention. Elements labeled the same as in FIG. 3 have similar functions and will not be detailed described herein. The cell balancing system 600 includes multiple battery packs 302_1-302_N.

The master controller 310 can monitor the cells #1-#M in the battery packs 302_1-302_N, and can transfer the energy from one or more cells having relatively high cell voltages to the unbalanced cell(s). An unbalanced cell can be a cell having a relatively low cell voltage, e.g., the cell having the lowest cell voltage in all the battery packs 302_1-302_N. Taking the battery pack 302_N-1 for example, if there is one or more unbalanced cells in the battery pack 302_N-1 that are detected by the master controller 310, the unbalanced cell(s) can be charged by one or more cells having relatively high cell voltages in the same battery pack 302_N-1 or charged by one or more cells having relatively high cell voltages in another battery pack, e.g., battery pack 302_N or 302_N-2.

Assume that the unbalanced cells are in the battery pack 302_N-1. If the battery pack 302_N-1 has one or more battery cells having relatively high cell voltages compared to the cells in the other battery packs, the energy from the cells having relatively high cell voltages can be transferred to the primary winding 142 in the battery pack 302_N-1. The balancing controller 380 in battery pack 302_N-1 is enabled and other balancing controllers can be disabled. As a result, the power from the secondary winding 144_1 in the battery pack 302_N-1 can be transferred to the unbalanced cells in the battery pack 302_N-1.

If the battery pack 302_N has one or more battery cells having relatively high cell voltages compared to the cells in other battery packs, the balancing controller 380 in the battery pack 302_N is enabled to transfer the energy from the cells having relatively high cell voltages to the primary winding 142 in the battery pack 302_N. The power from the primary winding 142 is further transferred to the secondary windings 144_1-144_3 in the battery pack 302_N. In one embodiment, the secondary winding 144_2 in the battery pack 302_N is electrically coupled in series with the secondary winding 144_1 in the battery pack 302_N-1. Thus, the power from the secondary winding 144_2 in the battery pack 302_N can be transferred to the secondary winding 144_1 in the battery pack 302_N-1. The switching controller 320 in the battery pack 302_N-1 is also enabled to transfer the power from the secondary winding 144_1 to the unbalanced cells in the battery pack 302_N-1.

If the battery pack 302_N-2 (not shown in FIG. 6) has one or more battery cells having relatively high cell voltages compared to the cells in other battery packs, the balancing controller 380 in the battery pack 302_N-2 is enabled to transfer the energy from the cells having relatively high cell voltages to the primary winding 142 in the battery pack 302_N-2. The power from the primary winding 142 is further transferred to the secondary windings 144_1-144_3 in the battery pack 302_N-2. In one embodiment, the secondary winding 144_3 in the battery pack 302_N-2 is electrically coupled in series with the secondary winding 144_1 in the battery pack 302_N-1. Thus, the power from the secondary winding 144_3 in the battery pack 302_N-2 can be transferred to the secondary winding 144_1 in the battery pack 302_N-1. The switching controller 320 in the battery pack 302_N-1 is also enabled to transfer the power from the secondary winding 144_1 to the unbalanced cells in the battery pack 302_N-1.

Moreover, the energy from one or more cells in one battery pack can be transferred to an unbalanced cell in another battery pack via one or more battery packs. For example, the energy from one or more cells in the battery pack 302_1 can be transferred to an unbalanced cell in battery pack 302_N-1 via battery packs 302_2-302_N-2.

Figure 7:
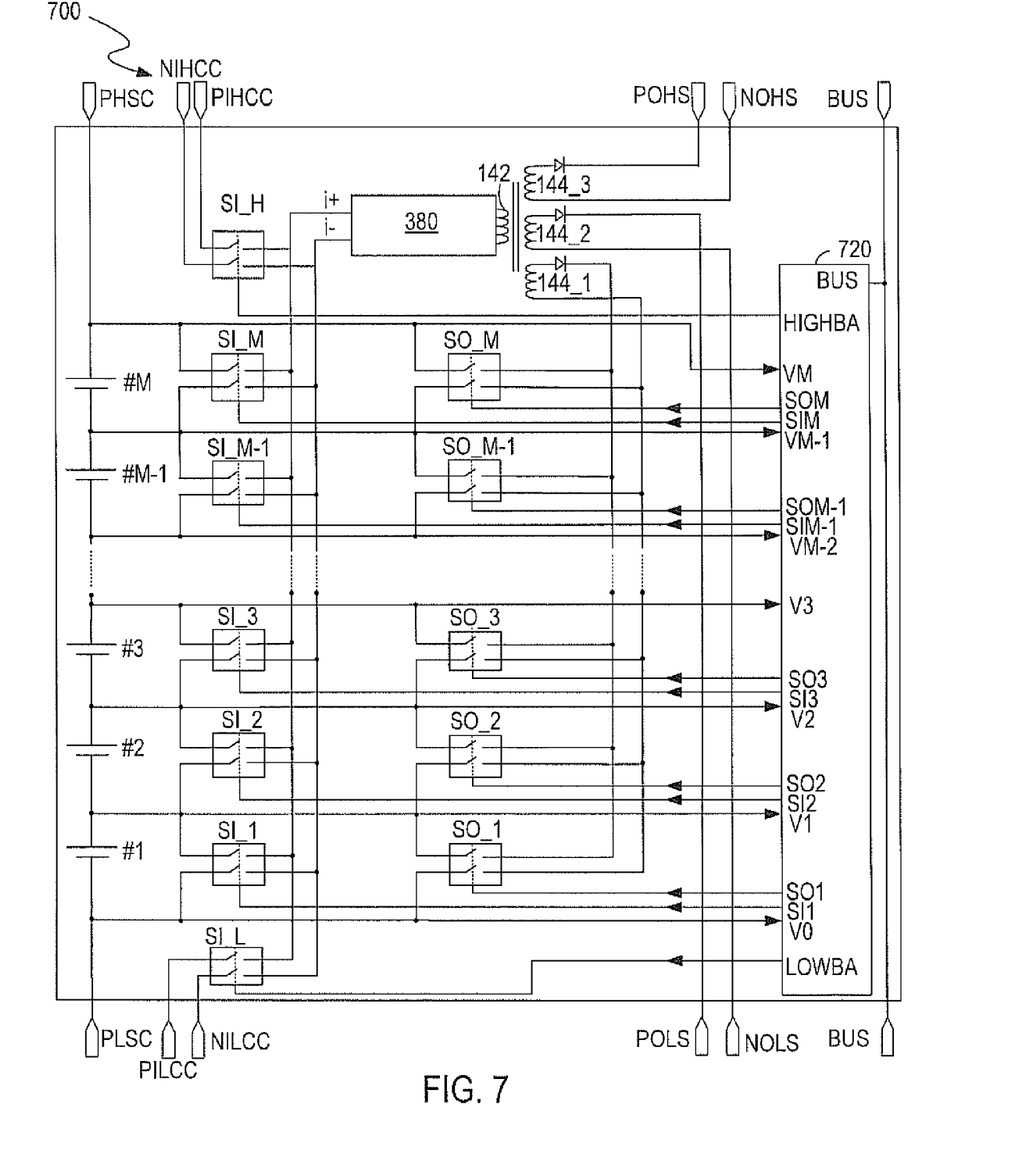
FIG. 7 shows a block diagram of a cell balancing system for a battery pack, in accordance with one embodiment of the present invention.

FIG. 7 shows a block diagram of a cell balancing system 700 for a battery pack, in accordance with one embodiment of the present invention. Elements labeled the same as in FIG. 4 and FIG. 5 have similar functions and will not be detailed described herein. As shown in FIG. 7, a switching controller 720 can monitor cell voltages and control a switching circuit including switches SI_1-SI_M, SO_1-SO_M, SI_L and SI_H according to the monitored cell voltages. The input switches SI_1-SI_M are coupled to the battery cells #1-#M respectively. The input switch SI_H can be coupled to one or more cells in a higher side battery pack. The input switch SI_L can be coupled to one or more cells in a lower side battery pack. The output switches SO_1-SO_M are coupled to the battery cells #1-#M respectively.

More specifically, the switching controller 720 controls the input switches SI_1-SI_M by switching signals SI1-SIM. Based on the cell voltages, the switching controller 720 (or the master controller 350 in FIG. 6) can selectively conduct one or more input switches from the input switches SI_1-SI_M to transfer the energy from one or more cells having relatively high cell voltages to the primary winding 142 via the balancing controller 380.

In one embodiment, the transformer has three secondary windings 144_1, 144_2 and 144_3. The ratio of the primary winding to each secondary winding 144_1-144_3 is 1:1, in one embodiment. As a result, assuming that the current flowing through the primary winding 142 is constant, the current flowing through each secondary winding 144_1-144_3 can be substantially equal to the same constant level. The switching controller 720 controls the output switches SO_1-SO_M by switching signals SO1-SOM. The output switches SO_1-SO_M are coupled to the secondary winding 144_1, in one embodiment. Based on the cell voltages, the switching controller 720 (or the master controller 350 in FIG. 6) can selectively conduct one or more output switches from the output switches SO_1-SO_M to transfer the power from the secondary winding 144_1 of the transformer to any unbalanced cells.

Furthermore, the switching controller 720 controls the input switch SI_H by a switching signal HIGHBA and controls the input switch SI_L by a switching signal LOWBA. When the switch SI_H is switched on, the energy from one or more cells in a higher side battery pack (not shown in FIG. 7) can be used to charge any unbalanced cell in the battery pack. Similarly, when the switch SI_L is switched on, the energy from one or more cells in a lower side battery pack (not shown in FIG. 7) can be used to charge any unbalanced cell in the battery pack.

Figure 8:
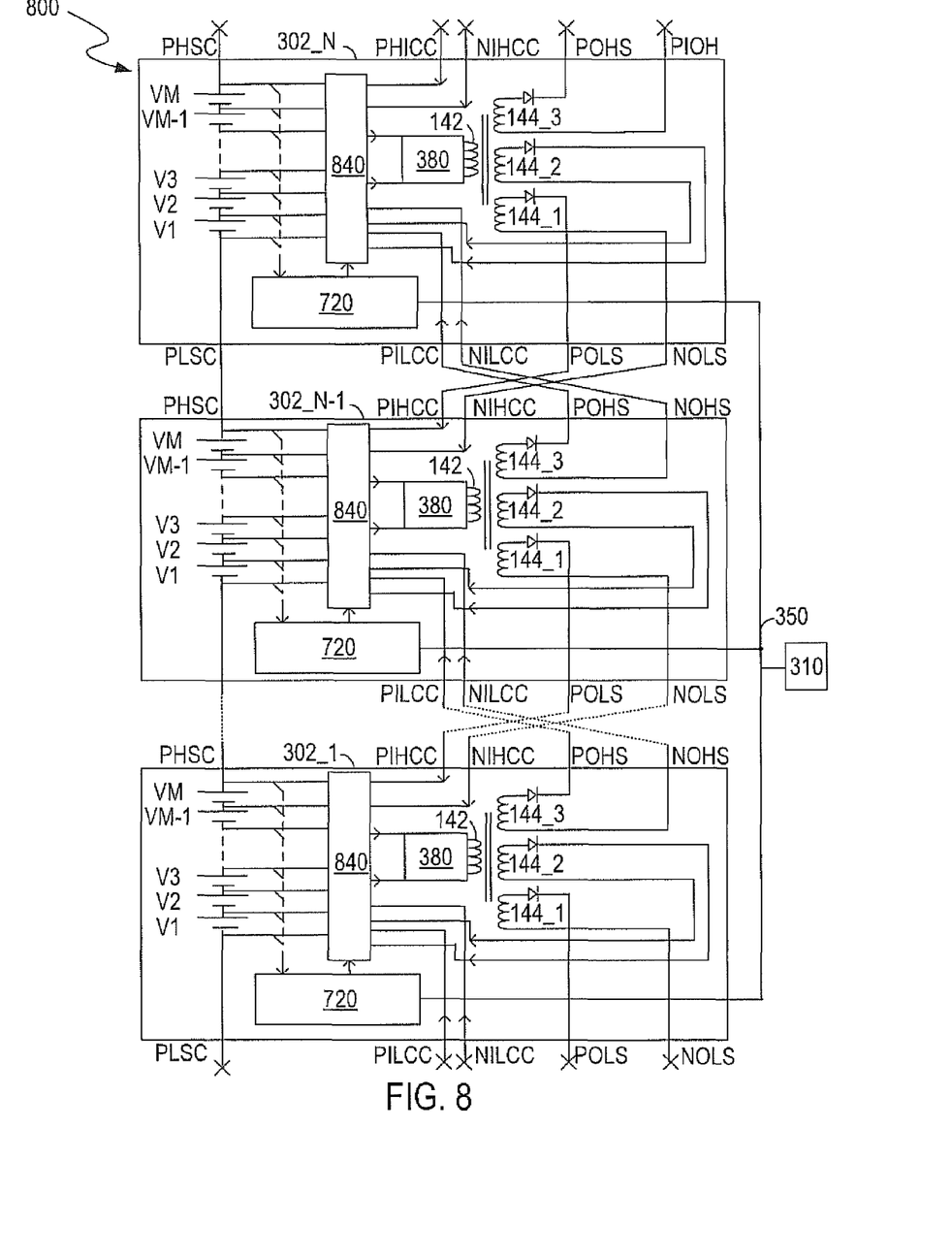
FIG. 8 shows a block diagram of a cell balancing system for a plurality of battery packs in series, in accordance with one embodiment of the present invention.

FIG. 8 shows a block diagram of a cell balancing system 800 for a plurality of battery packs in series, in accordance with one embodiment of the present invention. Elements labeled the same as in FIG. 6 and FIG. 7 have similar functions and will not be detailed described herein. The cell balancing system 800 includes battery packs 302_1-302_N.

More specifically, each battery pack 302_1-302_N includes a switching circuit 840 and a switching controller 720 for controlling the switching circuit 840. The master controller 310 can monitor the cells #1-#M in the battery packs 302_1-302_N, and can transfer the energy from one or more cells having relatively high cell voltages to the unbalanced cell(s). An unbalanced cell can be a cell having a relatively low cell voltage, e.g., the cell having the lowest cell voltage in all the battery packs 302_1-302_N. Taking the battery pack 302_N-1 for example, if there is one or more unbalanced cells in the battery pack 302_N-1 that are detected by the master controller 310, the unbalanced cell(s) can be charged by one or more cells having relatively high cell voltages in the same battery pack 302_N-1 or charged by one or more cells having relatively high cell voltages in another battery pack, e.g., battery pack 302_N or 302_N-2.

Assume that the unbalanced cells are in the battery pack 302_N-1. If the battery pack 302_N-1 has one or more battery cells having relatively high cell voltages compared to the cells in other battery packs, the energy from the cells having relatively high cell voltages can be transferred to the primary winding 142 in the battery pack 302_N-1. The balancing controller 380 in battery pack 302_N-1 is enabled and other balancing controllers can be disabled. As a result, the power from the secondary winding 144_2 in the battery pack 302_N-1 can be transferred to the unbalanced cells in the battery pack 302_N-1.

If the battery pack 302_N has one or more battery cells having relatively high cell voltages compared to the cells in other battery packs, the balancing controller 380 in the battery pack 302_N is enabled to transfer the energy from the cells having relatively high cell voltages to the primary winding 142 in the battery pack 302_N. The power from the primary winding 142 is further transferred to the secondary windings 144_1-144_3 in the battery pack 302_N. In one embodiment, the secondary winding 144_1 in the battery pack 302_N is electrically coupled to the primary winding 142 in the battery pack 302_N-1 via the corresponding switching circuit 840. Thus, the energy from the cells (in battery pack 302_N) having relatively high cell voltages can be transferred to the primary winding 142 of the transformer in the battery pack 302_N-1 via the transformer in the battery pack 302_N. The cell balancing controller 380 in the battery pack 302_N-1 is also enabled to transfer the power from the primary winding 142 to the secondary winding 144_2 in the battery pack 302_N-1. As a result, the power from the secondary winding 144_2 can be transferred to the unbalanced cells in the battery pack 302_N-1.

If the battery pack 302_N-2 (not shown in FIG. 8) has one or more battery cells having relatively high cell voltages compared to the cells in other battery packs, the balancing controller 380 in the battery pack 302_N-2 is enabled to transfer the energy from the cells having relatively high cell voltages to the primary winding 142 in the battery pack 302_N-2. The power from the primary winding 142 is further transferred to the secondary windings 144_1-144_3 in the battery pack 302_N-2. In one embodiment, the secondary winding 144_3 in the battery pack 302_N-2 is electrically coupled to the primary winding 142 in the battery pack 302_N-1 via the corresponding switching circuit 840. Thus, the energy from the cells (in battery pack 302_N-2) having relatively high cell voltages can be transferred to the primary winding 142 of the transformer in the battery pack 302_N-1 via the transformer in the battery pack 302_N-2. The cell balancing controller 380 in the battery pack 302_N-1 is also enabled to transfer the power from the primary winding 142 to the secondary winding 144_2 in the battery pack 302_N-1. As a result, the power from the secondary winding 144_2 can be transferred to the unbalanced cells in the battery pack 302_N-1.

Figure 9:
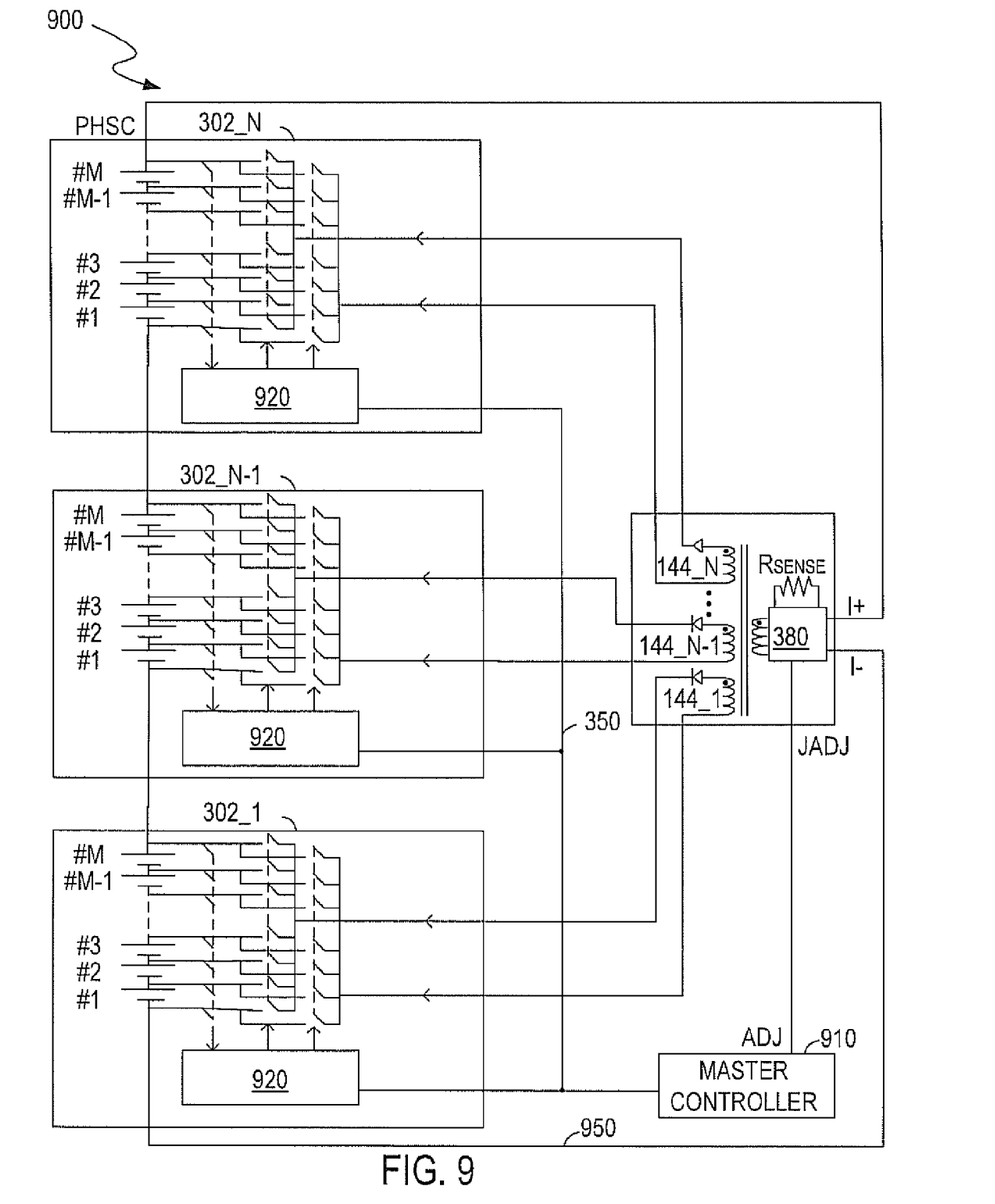
FIG. 9 shows a cell balancing system for a plurality of battery packs in series, in accordance with one embodiment of the present invention.

FIG. 9 shows a cell balancing system 900 for a plurality of battery packs in series, in accordance with one embodiment of the present invention. As shown in FIG. 9, the cell balancing system 900 includes a master controller 910 for communicating with a plurality of switching controllers 920 via a bus 950. A transformer in FIG. 9 has a primary winding 142 and multiple secondary windings 144_1-144_N. Each secondary winding 144_1-144_N is coupled to a corresponding battery pack. Each battery pack 302_1-302_N includes input switches coupled to the battery cells #1-#M respectively and output switches coupled to the battery cells #1-#M respectively.

Advantageously, the total energy of the battery packs 302_1-302_N can be used to charge one or more unbalanced cells in any of the battery packs 302_1-302_N. In other words, multiple cells having relatively low voltages (or having relatively low capacities) can be charged simultaneously by the total energy of the battery packs 302_1-302_N. The charging current can be controlled by the master controller 950.

Figure 10:
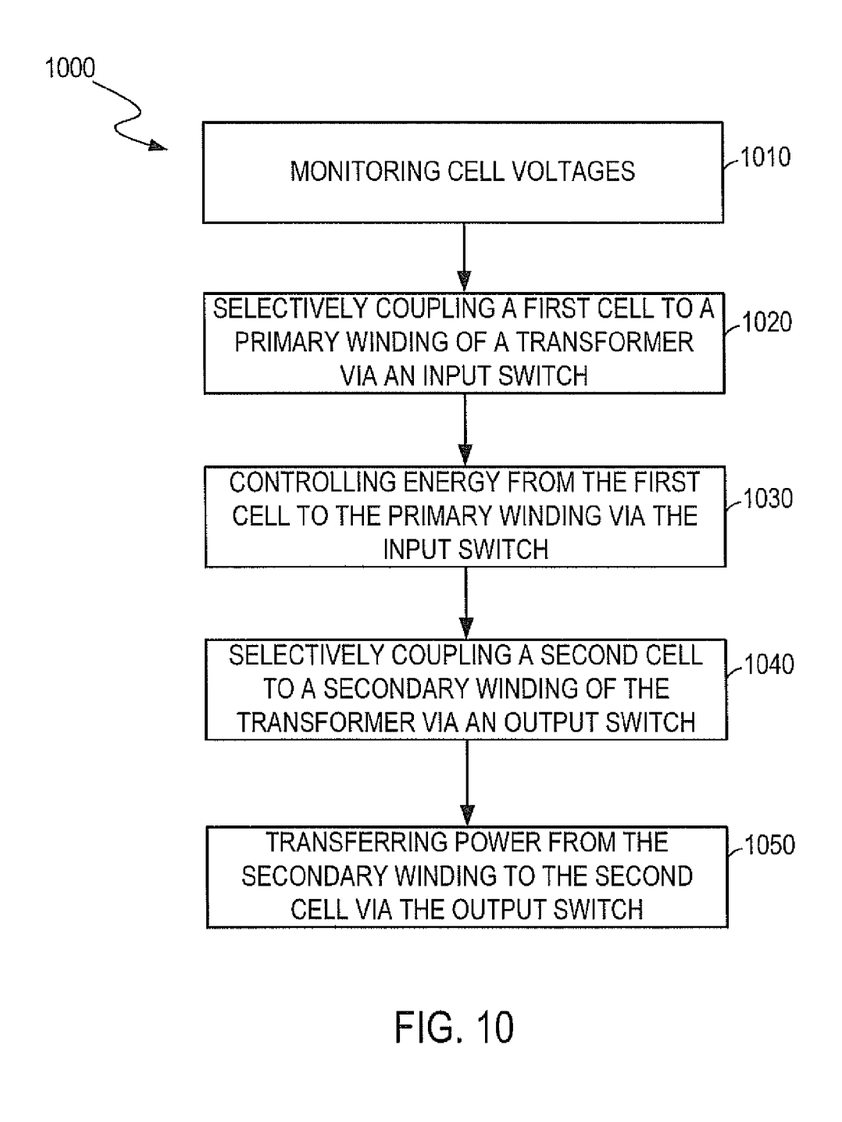
FIG. 10 shows a flowchart of operations performed by a cell balancing circuit, in accordance with one embodiment of the present invention.

FIG. 10 shows a flowchart 1000 of operations performed by a cell balancing circuit, in accordance with one embodiment of the present invention. FIG. 10 is described in combination with FIG. 3-FIG. 9. In block 1010, cell voltages of battery cells are monitored. For example, the switching controllers 320, 720 and 920 can monitor the cell voltages of the battery cells. The master controller 310 or 910 can also monitor the cell voltages of the battery cells. In block 1020, based on the monitored cell voltages, the switching controller 320, 720 or 920, or the master controller 310 or 910 can conduct an input switch to selectively couple a first cell having a relatively high cell voltage to a primary winding 142 of a transformer. Thus, in block 1030, the energy from the first cell can be transferred to the primary winding 142 via the conducted input switch. Specifically, a cell balancing controller, e.g., the cell balancing controller 380, can control the energy from the first cell to the primary winding 142. In block 1040, based on the monitored cell voltages, the switching controller 320, 720 or 920, or the master controller 310 or 910 can conduct an output switch to selectively couple a second cell (unbalanced cell) having a relatively low cell voltage to a secondary winding 144 of the transformer. Thus, in block 1050, the power from the secondary winding 144 can be transferred to the second cell via the conducted output switch. Consequently, the cell voltages of the battery cells can be balanced.

Accordingly, embodiments in accordance with the present invention provide cell balancing systems that can balance cell voltages/capacities by transferring energy from cells having relatively high voltages/capacities to cells having relatively low voltages/capacities. Advantageously, upon completion of the cell balancing, the energy stored in the battery pack can be higher compared to the battery pack using traditional cell balancing methods. The cell balancing system can be implemented inside or outside a battery management unit (BMU) in the battery pack.

What is claimed is:

1. A cell balancing circuit for energy efficient and increased energy storage balancing of a plurality of battery cells of a rechargeable multi-cell battery pack, said cell balancing circuit comprising:
   a transformer having a primary winding and a secondary winding;
   a switch coupled in series with said primary winding;
   a switching controller operable for selecting a first cell coupled to said primary winding and selecting a second cell coupled to said secondary winding, wherein said first cell and said second cell are coupled in series and wherein said first cell has a cell voltage that is greater than said second cell; and
   a controller coupled to said primary winding and operable for controlling energy from said first cell to said primary winding to transfer said energy from said first cell to said second cell to balance said battery cells, said controller operable for sensing a voltage across said primary winding and for comparing said voltage across said primary winding to an over-voltage protection threshold, wherein if said voltage across said primary winding exceeds said over-voltage threshold then said controller turns off said switch.

2. The cell balancing circuit of claim 1, wherein said controller controls said switch according to a current flowing through said primary winding.

3. The cell balancing circuit of claim 1, wherein said controller controls said switch according to preset reference signal indicative of a predetermined current flowing through said secondary winding.

4. The cell balancing circuit of claim 1, further comprising:
   a switching circuit controlled by said switching controller, wherein said switching circuit comprises a plurality of output switches coupled to said battery cells respectively.

5. The cell balancing circuit of claim 4, wherein said switching controller is configured to monitor a plurality of cell voltages of said battery of cells and to conduct an output switch of said output switches to transfer power from said secondary winding to said second cell.

6. The cell balancing circuit of claim 4, wherein said switching circuit further comprises a plurality of input switches coupled to said battery cells respectively, and wherein said switching controller is configured to monitor a plurality of cell voltages of said battery of cells and to conduct an input switch of said input switches to transfer said energy of said first cell to said primary winding.

7. The cell balancing circuit of claim 4, wherein said switching circuit further comprises an input switch coupled to said battery cells, and wherein said switching controller is configured to conduct said input switch to transfer energy of said battery cells to said primary winding.

8. A method for energy efficient and increased energy storage balancing of a plurality of battery cells of a rechargeable multi-cell battery pack, said method comprising:
   using a switching controller coupled to a transformer to selectively couple a first cell of said battery cells to a primary winding of said transformer and to selectively couple a second cell of said battery cells to a secondary winding of said transformer, wherein said first cell and said second cell are coupled in series and wherein said first cell has a cell voltage greater than said second cell;
   controlling energy from said first cell to said primary winding;
   transferring power from said secondary winding to said second cell;
   comparing a voltage across said primary winding to an over-voltage protection threshold; and
   if said voltage across said primary winding exceeds said over-voltage threshold, then turning off a switch that is coupled in series with said primary winding.

9. The method of claim 8, further comprising:
   controlling said switch according to a current flowing through said primary winding.

10. The method of claim 8, further comprising:
    controlling said switch according to a preset reference signal indicative of a predetermined current flowing through said secondary winding.

11. The method of claim 8, further comprising:
monitoring a plurality of cell voltages of said battery cells; and
conducting an output switch to transfer said power from said secondary winding to said second cell via said output switch according to said cell voltage.

12. The method of claim 8, further comprising:
monitoring a plurality of cell voltages of said battery cells; and
conducting an input switch to transfer said energy of said first cell to said primary winding via said input switch according to said cell voltages.

13. The method of claim 8, further comprising:
conducting an input switch to transfer energy of said battery cells to said primary winding.

14. A cell balancing system for energy efficient and increased energy storage balancing of a plurality of battery cells of a rechargeable multi-cell battery pack, comprising:
a first cell balancing controller operable for controlling energy from a first cell in a first plurality of cells to a primary winding of a first transformer;
a second cell balancing controller operable for transferring power from a secondary winding of a second transformer to a second cell in a second plurality of cells; and
a master controller operable for monitoring a first plurality of cell voltages of said first plurality of cells and monitoring a second plurality of cell voltages of said second plurality of cells, and for transferring said energy from said first cell to said second cell to balance said first plurality of cell voltages and said second plurality of cell voltages, wherein said first cell has a cell voltage that is greater than said second cell, said master controller further operable for comparing a voltage across said primary winding to an over-voltage protection threshold, wherein if said voltage across said primary winding exceeds said over-voltage threshold then said master controller turns off a switch coupled to said primary winding.

15. The cell balancing system of claim 14, further comprising:
a plurality of output switches coupled to said second plurality of cells respectively, wherein said master controller is configured to conduct an output switch of said output switches according to said first plurality of cell voltages and said second plurality of cell voltages, and wherein said power from said secondary winding is transferred to said second cell via said output switch.

16. The cell balancing system of claim 14, further comprising:
a plurality of input switches coupled to said first plurality of cells respectively, wherein said master controller is configured to conduct an input switch of said input switches according to said first plurality of cell voltages and said second plurality of cell voltages, and wherein said energy from said first cell is transferred to said primary winding via said input switch.

17. The cell balancing system of claim 14, wherein said secondary winding of said second transformer is coupled to a secondary winding of said first transformer in series.

18. The cell balancing system of claim 14, wherein a secondary winding of said first transformer is electrically coupled to a primary winding of said second transformer, and wherein said energy of said first cell is transferred to said primary winding of said second transformer via said first transformer.

19. The cell balancing system of claim 18, wherein power of said primary winding of said second transformer is transferred to said second cell via said secondary winding of said second transformer.

20. The cell balancing system of claim 14, further comprising:
a first switching controller for controlling a first plurality of switches coupled to said first plurality of cells respectively; and
a second switching controller for controlling a second plurality of switches coupled to said second plurality of cells respectively, wherein said master controller is configured to control said first switching controller and said switching controller.

* * * * *